G. W. GOODWYN.
Nut-Lock.
No. 219,714. Patented Sept. 16, 1879.
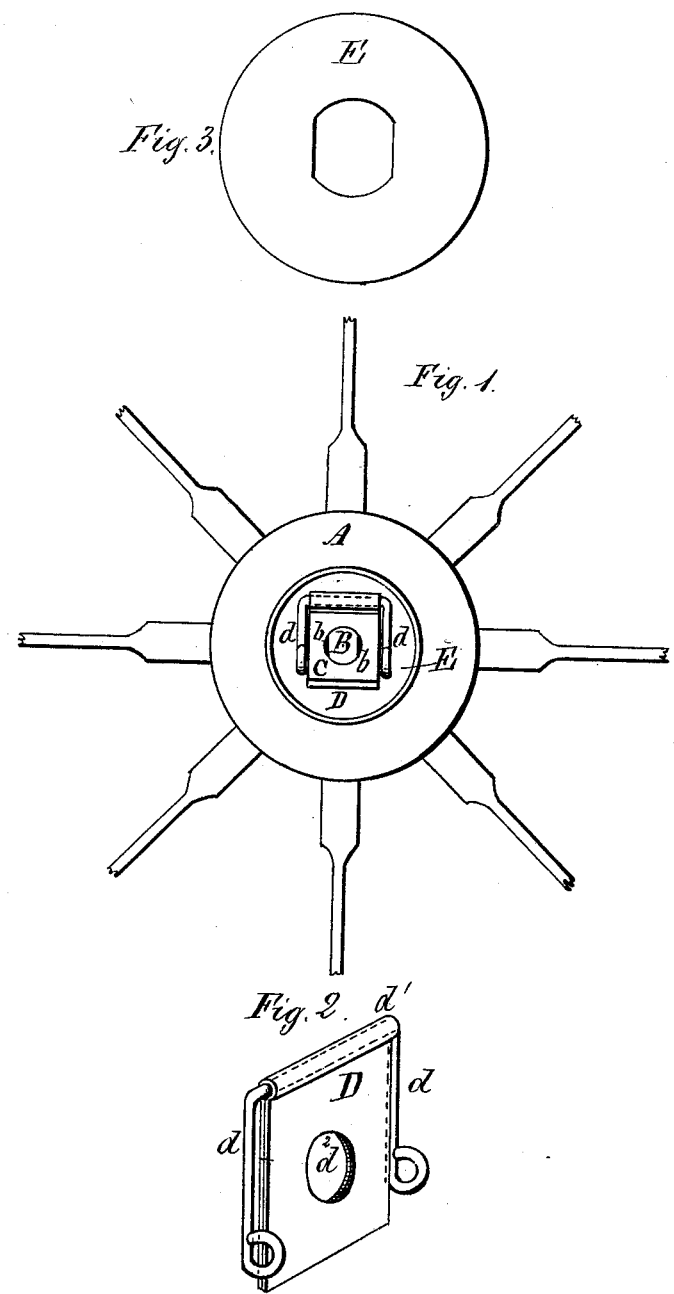

UNITED STATES PATENT OFFICE.

GEORGE W. GOODWYN, OF PETERSBURG, VIRGINIA, ASSIGNOR OF ONE-HALF HIS RIGHT TO RICHARD BAGBY, OF SAME PLACE.

IMPROVEMENT IN NUT-LOCKS.

Specification forming part of Letters Patent No. 219,714, dated September 16, 1879; application filed March 20, 1879.

*To all whom it may concern:*

Be it known that I, GEORGE W. GOODWYN, of the city of Petersburg, in the county of Dinwiddie and State of Virginia, have invented new and useful Improvements in Nut-Locks, of which the following is a specification.

My invention relates more particularly to the construction and application of a lock for the nuts of vehicle-axles, and, in combination therewith, of a washer, as hereinafter more fully described.

The object of the invention is to produce a nut-lock capable of being applied to all classes of vehicles without materially changing the construction of the axle, and which shall be cheap and simple in construction, and adapted to be readily applied.

In the accompanying drawings, A represents the hub of a wheel, Figure 1; B, the axle, cut away upon one or more sides, $b$, to form flat bearing-surfaces for the corresponding sides of the washer E, which is in contact with the face of the hub A, and is prevented from rotating with it, as will be readily understood; and D is the nut-lock, consisting of a piece of sheet metal doubled in such a manner as to form a bearing, $d^1$, for the reception of a locking-lever, $d$, composed of a bar bent at right angles at both extremities to form depending arms, which are looped at the ends to provide a hole for raising and lowering the lever-arms to lock or unlock the nut. This nut-lock is fully shown in Fig. 2, and is further provided with an opening, $d^2$, for the passage of the axle B.

By means of the above-described construction of nut-lock I provide a simple and cheap device for locking the nuts of vehicle-axles, readily applied and effective in its operation, and adapted to be applied to any vehicle in use, as it requires only the filing away of one or more sides of the axle end to form the bearing-surfaces $b$, which, in conjunction with like surfaces in the washer E, Fig. 3, prevents the latter, together with the nut-lock, from rotating with the hub through frictional contact.

The application of the device is as follows: The nut C being removed, the washer E is slipped on the axle end, so that its bearing-surfaces coincide with those of the axle. The nut-lock D is then slipped upon the axle in contact with the washer E, and the latter in contact with the face of the hub B, the lever-arms are raised, and the nut C screwed home, when the arms of the lever are lowered upon the opposite sides of the nut, as shown in Fig. 1, to lock the nut in position.

As there is no friction whatever upon either of the faces of the lock-plate, the friction being upon the washer E, there is no wear of the lock, while the washer may be readily replaced by a new one when worn out. The wear of the face of the hub may also be compensated by applying washers of increased thickness at that point where the hub is in contact with the washer.

It will be evident that although I have described the nut-lock as adapted more particularly for locking the nuts of vehicles, it may be employed for locking the nuts upon bolts on machinery, or for other purposes.

Instead of employing a locking-lever, as shown and described, to lock the nuts of vehicles, a cap made of sheet metal, hinged to the metallic plate and adapted to surround the nut, may be employed, its vertical sides taking the place of the lever-arms, and, when the cap is brought down upon the nut, effectually prevents all access of dust and dirt to the axle.

In cases where a yielding bearing is required for the nut of a bolt, the metallic plate of the nut, when doubled upon itself, may be so arranged as to form such a yielding bearing by spreading apart the two leaves below the lever-bearing, $d^1$, and by properly tempering them in order to act as springs.

I am aware that nut-locks have been employed for locking two or more nuts by means of a hinged lever, either connecting together a series of washers to prevent their rotation upon the bolts, or provided with bent ends to abut against the adjacent faces of two nuts; and I do not wish to claim such, broadly, nor do they embody the object of my invention; but What I do claim is—

1. A nut-lock composed of a plate or blank of sheet metal bent to form a bearing, $d^1$, and an elastic bearing for the nut by spreading the leaves below said bearing $d^1$, in combination with a lever, d, having its opposite ends bent at right angles and adapted to bear upon opposite sides of nut, substantially as described, for the purpose specified.

2. The combination, with the hub, axle, and nut of a vehicle, said axle having one or more flat bearing-surfaces formed upon its extremity, with the washer E, having corresponding bearing-surfaces, and the nut-lock D, all constructed, arranged, and operating as and for the purpose specified.

In witness that I claim the foregoing I have hereunto set my hand and seal this 18th day of March, 1879.

GEORGE W. GOODWYN. [L. S.]

Witnesses:
THOMAS N. GRIFFIN,
HENRI GUILLAUME.